L. SCUSA.
CALIPER GAGE.
APPLICATION FILED JULY 9, 1917.
1,277,648.
Patented Sept. 3, 1918.
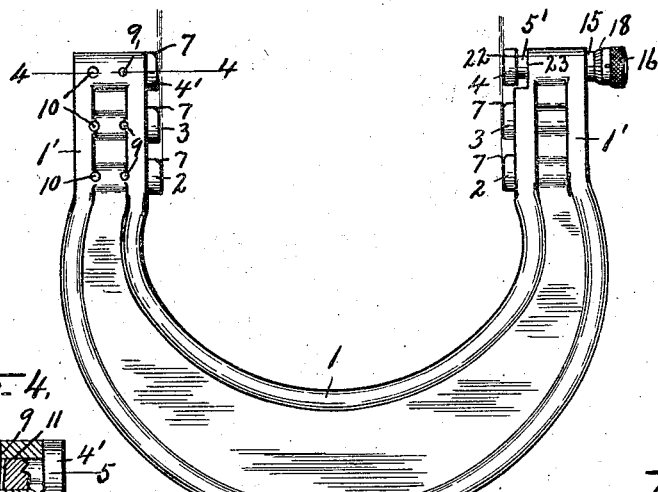
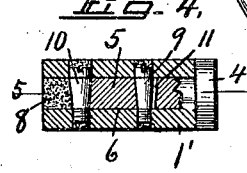
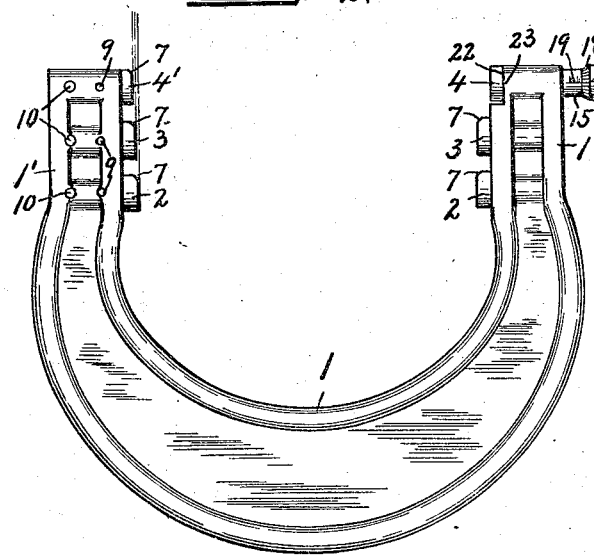
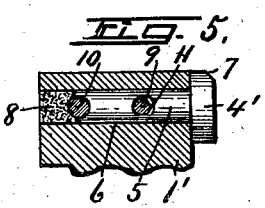
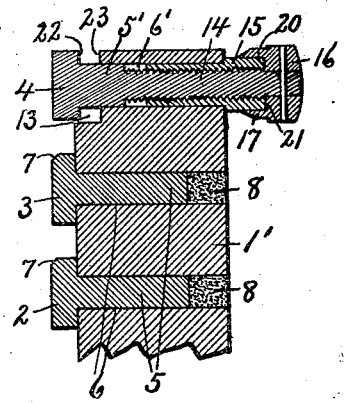
WITNESSES:
H. N. Furst.
INVENTOR
L. Scusa
BY Howard P. Denison
ATTORNEY.

UNITED STATES PATENT OFFICE.

LINO SCUSA, OF SYRACUSE, NEW YORK.

CALIPER-GAGE.

1,277,648.	Specification of Letters Patent.	Patented Sept. 3, 1918.

Application filed July 9, 1917. Serial No. 179,402.

*To all whom it may concern:*

Be it known that I, LINO SCUSA, a citizen of the United States of America, and resident of Syracuse, in the county of Onondaga, in the State of New York, have invented new and useful Improvements in Caliper-Gages, of which the following, taken in connection with the accompanying drawings, is a full, clear, and exact description.

This invention relates to certain improvements in caliper gages involving the use of a plurality of sets of coöperative contacts arranged at different distances from the open side of the gage, and progressively diminishing in measuring distances from the outermost set inwardly, one of the contacts of the outermost set having a micrometer adjustment.

The primary object is to combine in a single instrument of this character a micrometer gage and what is technically known as a "limit" or "snap" gage in which the micrometer adjustment is limited to a distance not less than the distance between the coöperative contacts of the other sets so that the operator may at any time determine exactly the amount of stock which it may be necessary to remove to enable the work operated upon to enter the limit gage without in any way disturbing the limit gage or gages, thereby assuring greater accuracy of work with less loss of time and material, and at the same time avoiding the necessity of forcing the gage upon the work, thus reducing the wear upon the contacts and removing the danger of springing the gage open.

Another object is to reduce the first cost and subsequent repairs to a minimum by simplifying the construction and permitting the contacts to be easily and quickly replaced when worn.

A further object is to provide simple means for adjusting and locking the relatively fixed contacts to compensate for wear thereof.

Other objects and uses relating to specific parts of the device will be brought out in the following description.

In the drawings—

Figures 1 and 2 are similar face views of a caliper gage embodying the features of my invention, the micrometer gage being shown in Fig. 1 at the limit of its inward movement, while in Fig. 2 it is shown in its extreme outward position.

Fig. 3 is an enlarged longitudinal sectional view through the terminal end of one side of the gage showing the adjacent contacts including the micrometer attachment.

Fig. 4 is an enlarged transverse sectional view taken on line 4—4, Fig. 1.

Fig. 5 is a detail sectional view taken in the plane of line 5—5, Fig. 4, except that the contact bolt is in elevation.

As illustrated, this gage comprises a U-shape bar —1— having a plurality of, in this instance two, sets of relatively locked coöperative test contacts or gage-pins —2— and —3— and an additional set of coöperative measuring contacts or gage pins —4— and —4'—, one of which, as —4'—, is locked, while the other, as —4—, is adjustable toward and from the contact —4'— and provided with a micrometer attachment for measuring the amount of said adjustment in a manner hereinafter described.

The terminal ends of the bar —1— are parallel and spaced some distance apart for receiving and supporting the contacts which are arranged in the same plane in equally spaced relation gradually increasing distances from the open side of the gage so that those of each set will be coaxial.

The contacts —2—, —3— and —4'— are provided with reduced cylindrical shanks —5—, preferably of the same diameter closely fitted in corresponding openings —6— in the opposite parallel arms, as —1'—, of the bar —1—, the inner ends thereof being circular and of greater diameter than the shanks to constitute the contact members proper and are initially seated tightly against the inner faces of the arms —1'—.

These heads or contacts are preferably hardened to resist wear and their inner front corners or edges nearest the open side of the gage are preferably beveled at —7— to enable them to be more easily registered with the work in testing the diameters of the latter.

The shanks —5— of the contacts —2—, —3— and —4'— are preferably somewhat shorter than the thickness of the arms —1'— in which they are mounted so that their outer ends terminate a greater or less distance from the corresponding outer edges of the arms, while the openings —6— in which they are closely fitted extend to the outer faces of said arms, and the portions thereof not occupied by the shanks —5— are filled in by bodies —8— of wax or other sealing substance to prevent malicious interference with the contacts without detection, and at the same time affording a smooth finish for the outer surface of the gage.

The inner faces of all of the contacts —2—, —3—, —4— and —4'— are carefully milled in slightly different parallel planes so that the distance between the coöperative contacts gradually diminishes from the open side of the caliper.

In devices of this character, the function of which is to make extremely close measurements to the fraction of one-thousandth of an inch, the slightest wear of the surfaces of the contacts would impair their use, and in order to compensate for this wear and to keep the coöperative contacts to a standard gage, I have provided simple means for adjusting the contacts —2—, —3— and —4'— on the arm opposite the micrometer contact and locking them in their adjusted positions so that for all practical purposes they are fixed members of the caliper arms.

The means for producing the compensating adjustment of each of these members comprises a pair of taper screws —9— and —10— arranged in transverse openings in said arm and registering, respectively, with a concave seat in the outer ends of the contact bolts and apertures —11— through said bolts, the screw openings —11— in the contact bolts being of slightly greater diameter than the portions of the screws which pass therethrough.

The reduced ends of the screws are threaded and engaged in threaded apertures at one side of the contact bolts, while the opposite ends are cylindrical and seated in apertures at the opposite sides of the bolts where they are accessible for the reception of a screw-driver or similar tool for turning them.

The intermediate portions of the screws which pass through the openings for the contact bolts are tapered, that of the screw —10— being engaged with the concave end face of the contact bolt, while that of the screw —9— engages the side of the screw-opening —11— nearest the end of the bolt so that if adjustment becomes necessary to compensate for wear upon the contact face of the bolt, all that is necessary to do is to loosen the screw —9— and tighten the screw —10— until the contact face of the bolt is brought to the desired position by wedging action of the screw —10— against the end face of the bolt, whereupon the screw —9— may be retightened to firmly lock the bolt in its adjusted position.

The other contact members —2— and —3— on the side of the gage corresponding to that at which the micrometer attachment is located are tightly fitted in their respective openings —6—.

The contact member —4— is also provided with a reduced portion —5'— movable with an easy sliding fit in a transverse opening —6'— in the adjacent arm of the bar —1— parallel with the openings —6— and shanks —5— of the contact bolts —2— and —3—, the contact end of the member —4— being of greater diameter than the shank portion —5'— and is movable into and out of a recess —13— in the inner face of the adjacent arm —1'—.

This contact bolt —4— is also provided with a further reduced threaded stem —14— engaged with an internally threaded sleeve —15— which is tightly fitted in the outer end of the opening —6'—, said threaded portion —14— being extended beyond the outer end of said sleeve, and is rigidly secured to an external collar —16— having an annular flange —17— telescoping with the outer end of said sleeve.

The inner end of the flange —17— is tapered and provided with a circular scale —18— coöperating with a lengthwise scale —19— on the periphery of the outer end of the sleeve —15—, thus constituting a micrometer for measuring the degree of adjustment of the contact member —4— to the fraction of a thousandth of an inch.

One of the important features of my invention consist in providing the micrometer adjustment with means for limiting the inward movement of the contact member —4— a distance from its coöperative contact —4'— not greater, and preferably slightly less, than the distance between the other coöperative contacts, and for this purpose the sleeve —15— and collar —16— are provided with coöperative limiting stops —20— and —21— which are carefully adjusted so that they will engage each other when the contact face of the member —4— is adjusted to a plane just outside that of the adjacent contact member —3—.

The outward movement of this contact member —4— is also limited by the engagement of its inner face or shoulder with the outer wall, as —23—, of the recess —13—, as shown more clearly in Figs. 2 and 3, the amount of adjustment of the member —4— being substantially equal to the thickness of its head.

The coöperative contacts —2— and —3— are set at different predetermined distances apart according to the limitations in which the work must be finished, as indicated by the dotted lines leading from the inner faces of said contact members, Fig. 1, the distance between the inner contact members —2— being slightly less than that between the contact members —3—.

That is in applying the calipers to the work, if the latter will pass between the coöperative contacts —3— and will not pass between the contacts —2—, it is acceptable, while on the other hand if it will pass between the coöperative contacts —2—, it is too small and, therefore, rejected.

The coöperative contacts —4— and —4'— are more for the purpose of obtaining the actual diameter of the work after it is reduced to approximately the size desired, the micrometer gage being employed for the purpose of determining just how much stock is to be taken off to enable the work to pass between the contacts —3— and not between the contacts —2—.

The purpose in limiting the inward movement of the contact member —4— so that the minimum distance between it and its companion member —4'— will not be less, but preferably slightly greater than the distance between the coöperative contact members —3—, is to determine the maximum diameter to which the work may be turned to be acceptable.

That is, when the contact member —4— is adjusted to the limit of its inward movement and the work will pass between it and its companion member —4'—, and will not pass between the coöperative contacts —3—, it may still be acceptable, but if not, it indicates the exact amount of stock which must be taken off to enable it to pass between the the contact members —3— and not between the contact members —2—. The tapered screws —9— and —10— afford a particularly simple and effective means for making such slight adjustment of the contact members —2—, —3— and —4'— as may be necessary from time to time or in the initial calibration,—in that one screw may be used for adjusting the contact in one direction and locking it against movement in the opposite direction, while the other screw serves to adjust the contact member in the last-named direction and to lock it against movement in the first-named direction, thereby assuring a very close and positive adjustment in either direction and an equally positive lock in the adjusted position.

What I claim is:

1. A caliper gage having a plurality of sets of coöperative contacts, the distance between the contacts of said sets progressively diminishing from the open side of the gage, one of the contacts of the set nearest said open side being adjustable to vary its distance from its coöperative contact, a micrometer attachment for measuring the amount of said adjustment, and means for limiting said adjustment so that said distance cannot be made less than that between the contacts of the other sets.

2. A caliper gage having separate sets of coöperative contacts at different distances from the open side thereof, those of the inner set being of less distance apart than those of the outer set, one of the contacts of the outer set having a micrometer attachment for adjusting it and for measuring the amount of said adjustment, and means for limiting the approach of the adjustable contact toward the opposite contact to a distance greater than the distance between the contacts of the other set.

In witness whereof I have hereunto set my hand this 6th day of July, 1917.

LINO SCUSA.

Witnesses:
H. E. CHASE,
ALICE M. CANNON.

Copies of this patent may be obtained for five cents each, by addressing the "Commissioner of Patents, Washington, D. C."